United States Patent
Speranza et al.

(10) Patent No.: US 7,182,312 B1
(45) Date of Patent: Feb. 27, 2007

(54) REPLACEABLE OUTLET ON A CYLINDER VALVE

(75) Inventors: Patrick Speranza, Cranesville, PA (US); Mia Renee Daniels, Coraopolis, PA (US)

(73) Assignee: Harsco Technologies Corporation, Fairmont, MN (US)

( * ) Notice: Subject to any disclaimer, the term of this patent is extended or adjusted under 35 U.S.C. 154(b) by 0 days.

(21) Appl. No.: 11/259,438

(22) Filed: Oct. 26, 2005

(51) Int. Cl.
*F16K 51/00* (2006.01)
(52) U.S. Cl. .................................... 251/144
(58) Field of Classification Search ................ 251/142, 251/144, 151
See application file for complete search history.

(56) References Cited

U.S. PATENT DOCUMENTS

| | | | | |
|---|---|---|---|---|
| 4,543,980 A | * | 10/1985 | van der Sanden | ............ 215/18 |
| 4,697,611 A | * | 10/1987 | Winland et al. | ............ 251/144 |
| 4,813,575 A | * | 3/1989 | O'Connor | ................... 251/82 |
| 4,934,654 A | * | 6/1990 | Linnemann | .................. 251/144 |
| 5,036,876 A | * | 8/1991 | Jernberg | ...................... 251/82 |
| 5,452,746 A | * | 9/1995 | Hoobyar et al. | ............ 251/144 |
| 5,755,425 A | * | 5/1998 | Marolda | ..................... 251/144 |
| 6,732,996 B1 | | 5/2004 | Kremer | |

* cited by examiner

*Primary Examiner*—John Bastianelli
(74) *Attorney, Agent, or Firm*—David C. Jenkins; Eckert Seamans Cherin & Mellott, LLC

(57) ABSTRACT

A valve assembly having a body and a removable outlet adaptor with an anti-rotation device structured to resist rotation and movement of the removable outlet adaptor during installation and/or removal. The anti-rotation device has a first component on the removable outlet adaptor and a second component on the valve body.

17 Claims, 4 Drawing Sheets

REPLACEABLE OUTLET ON A CYLINDER VALVE

BACKGROUND OF THE INVENTION

1. Field of the Invention

This application relates to a valve assembly and, more specifically to a valve assembly having a removable outlet assembly wherein the removable outlet assembly includes an anti-rotation device.

2. Background Information

Valve assemblies for compressed gas vessels typically include a valve body having an internal passage extending from an inlet to an outlet. A valve member coupled to an external actuator is disposed in the passage. The valve member is structured to move between an open position, wherein the valve member does not block a fluid from flowing through the passage, and a closed position, wherein the valve member blocks a fluid from flowing through the passage. The outlet, and often the inlet, typically includes a collar having a threaded surface as well as one or more seals. The valve assembly is coupled at the inlet to a vessel for a compressed gas, liquefied gas, or cryogenic fluid. As the vessel is typically filled via the valve assembly, it is not unusual for the installation of the valve assembly on the vessel to be semi-permanent.

The outlet, on the other hand, is coupled to use a device, such as, but not limited to, a regulator, or a manifold system, accumulator, flexible connectors or balloon inflator. As the use device typically must be removed in order to refill the vessel, the outlet is subjected to additional wear and tear due to frequent coupling/decoupling of the use device. Such wear and tear may result in severe or cosmetic damage to the threads, seals or other surfaces of the outlet. When the outlet is damaged, the entire valve assembly must be replaced. This is a disadvantage as the inlet and other components of the valve assembly may still be fully functional.

Alternatively, a valve assembly outlet may need replaced for reasons not related to damage. For example, certain valve assemblies are structured to be coupled to specific devices. To ensure that an improper device is not coupled to the valve assembly, the outlet has an unusual configuration, e.g., an unusual diameter or thread pitch. Valve assemblies may also have a specific outlet configuration related to the type of fluid stored in the vessel. When a vessel coupled to such a valve assembly is to be used for a different purpose, the entire valve assembly must be removed and replaced. As noted above, coupling and decoupling may lead to damage; in this instance, damage to the inlet and possibly the vessel.

To reduce the chance of damage to a vessel and/or to reduce the cost of replacing a valve assembly with a damaged outlet, or when an outlet with a different configuration is required, valve assemblies with removable outlet adaptors were created. These valve assemblies had a landing with a generally flat surface encircled by a wide diameter threaded collar. A retaining ring was structured to engage the landing collar threads. Thus, a removable outlet adaptor having a body with a first, valve end and a second, outlet end could be removable coupled to the valve assembly. The outlet adaptor outlet end was configured to match the dimensions of the outlet of the prior art valve assemblies. Therefore, when a user needed to change the outlet, the retaining ring was removed and a new removable outlet adaptor installed.

The disadvantage to the prior art removable outlet adaptors was that the removable outlet adaptor was free to rotate and move laterally during installation. Such rotation or lateral movement would lead to damage to either, or both, the removable outlet adaptor, the landing surface, and/or any seals located at the adaptor/valve interface.

There is, therefore, a need for a removable outlet adaptor that is less prone to rotate and/or move during installation and removal.

There is a further need for a removable outlet adaptor having an extension structured to engage the valve assembly body wherein the extension is structured to reduce rotation of the outlet adaptor.

SUMMARY OF THE INVENTION

The present invention provides a valve assembly having a removable outlet adaptor with an anti-rotation device structured to resist rotation and movement of the removable outlet adaptor during installation and/or removal. The valve assembly includes a body with a generally flat landing having a generally flat surface encircled by a threaded collar. The removable outlet adaptor includes an elongated body having an outlet end structured to engage a use device. In one embodiment, the end opposite the outlet end, the valve engaging portion, has a generally flat surface structured to engage the landing surface. The anti-rotation device includes a first component on the body of the removable outlet adaptor and a second component on the body of the valve assembly. For example, the anti-rotation device may include two spaced pins extending parallel to the longitudinal axis of the anti-rotation device body and two spaced pin openings on the valve assembly body. The pins are structured to engage the pin openings. Thus, during installation, the removable outlet adaptor resists rotating by virtue of the pins being disposed in the pin openings.

Alternatively, the removable outlet adaptor may have a non-circular outer shape and the landing surface may have a cavity with a corresponding shape. That is, the removable outlet adaptor may have a first, outlet end and a second, valve engaging portion. The outlet end is generally cylindrical and includes threads structured to engage a use device. The valve engaging portion has a non-circular outer shape such as, but not limited to, a square or a hexagon. The valve assembly landing includes a square or hexagonal cavity. Thus, when the removable outlet adaptor valve engaging portion is disposed in the valve assembly landing cavity, the removable outlet adaptor is substantially prevented from rotating or moving laterally relative to the landing surface.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
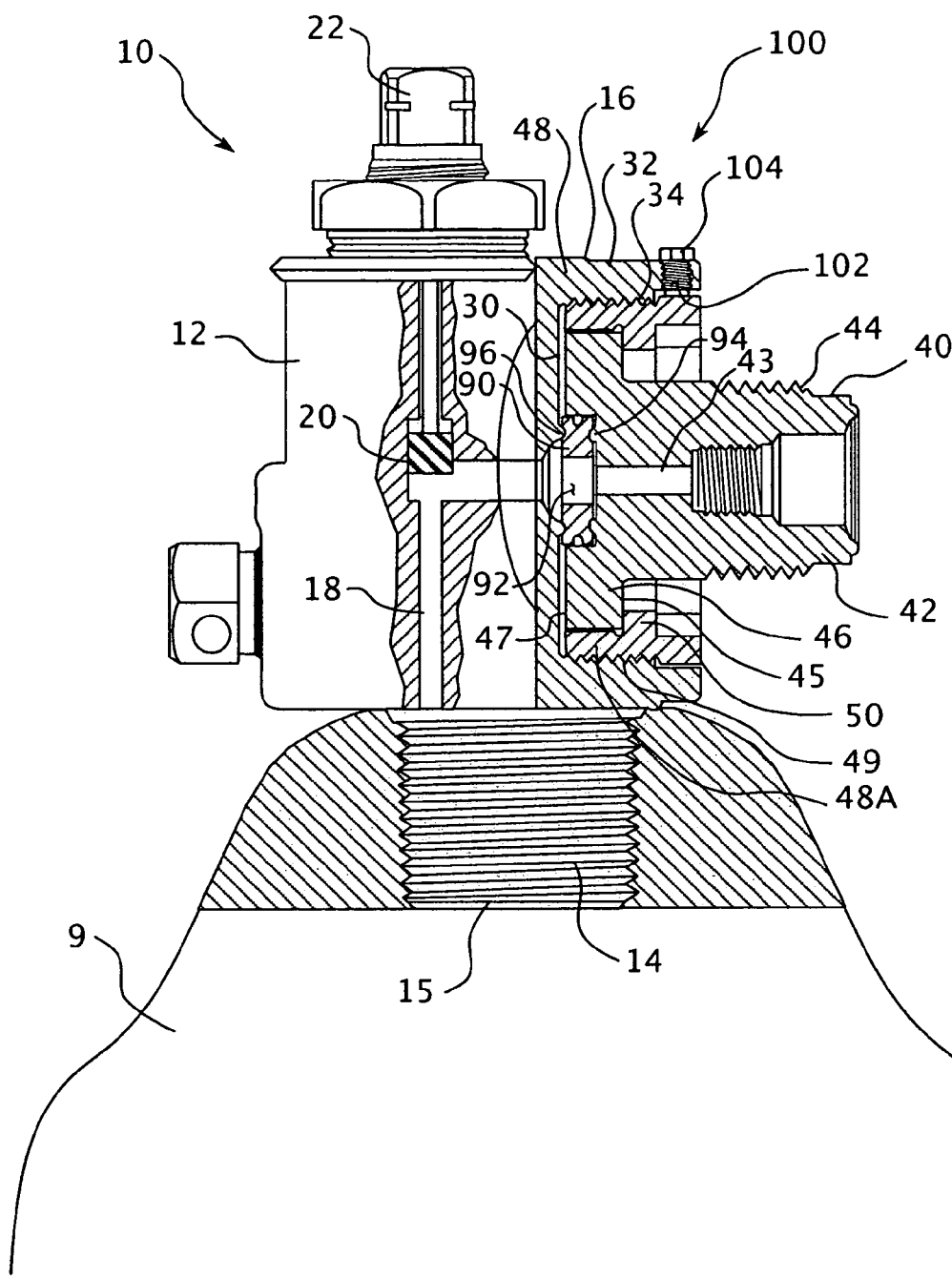
FIG. 1 is a partial cross-sectional side view of a valve assembly.

As used herein, directional terms, such as "upper" and "lower" relate to the assembly as shown in the Figures and are not limiting upon the claims.

The valve assembly 10 includes an elongated valve body 12 having a vessel coupling 14, a landing 16, and an internal passage 18. The internal passage 18 extends between the vessel coupling 14 and the landing 16. The vessel coupling 14 is, preferably, a threaded end 15 structured to engage the vessel 9. The valve assembly 10 also includes a movable valve member 20, which is disposed in the internal passage 18, and an actuating device 22. The actuating device 22 is structured to move the valve member 20 between an open position, wherein the valve member 20 does not block a fluid from flowing through the internal passage 18, and a closed position, wherein the valve member 20 blocks a fluid from flowing through the internal passage 18. Typically, the vessel coupling 14 is located at a lower end of the valve body 12 and the actuating device 22 is disposed at the upper end of the valve body 12. The landing 16 is disposed on a lateral side of the valve body 12. The internal passage 18 extends generally along the axis of the valve body 12 at the vessel coupling 14 and generally normal to the landing 16. Accordingly, the internal passage 18 preferably extends along a generally right angle.

Figure 4:
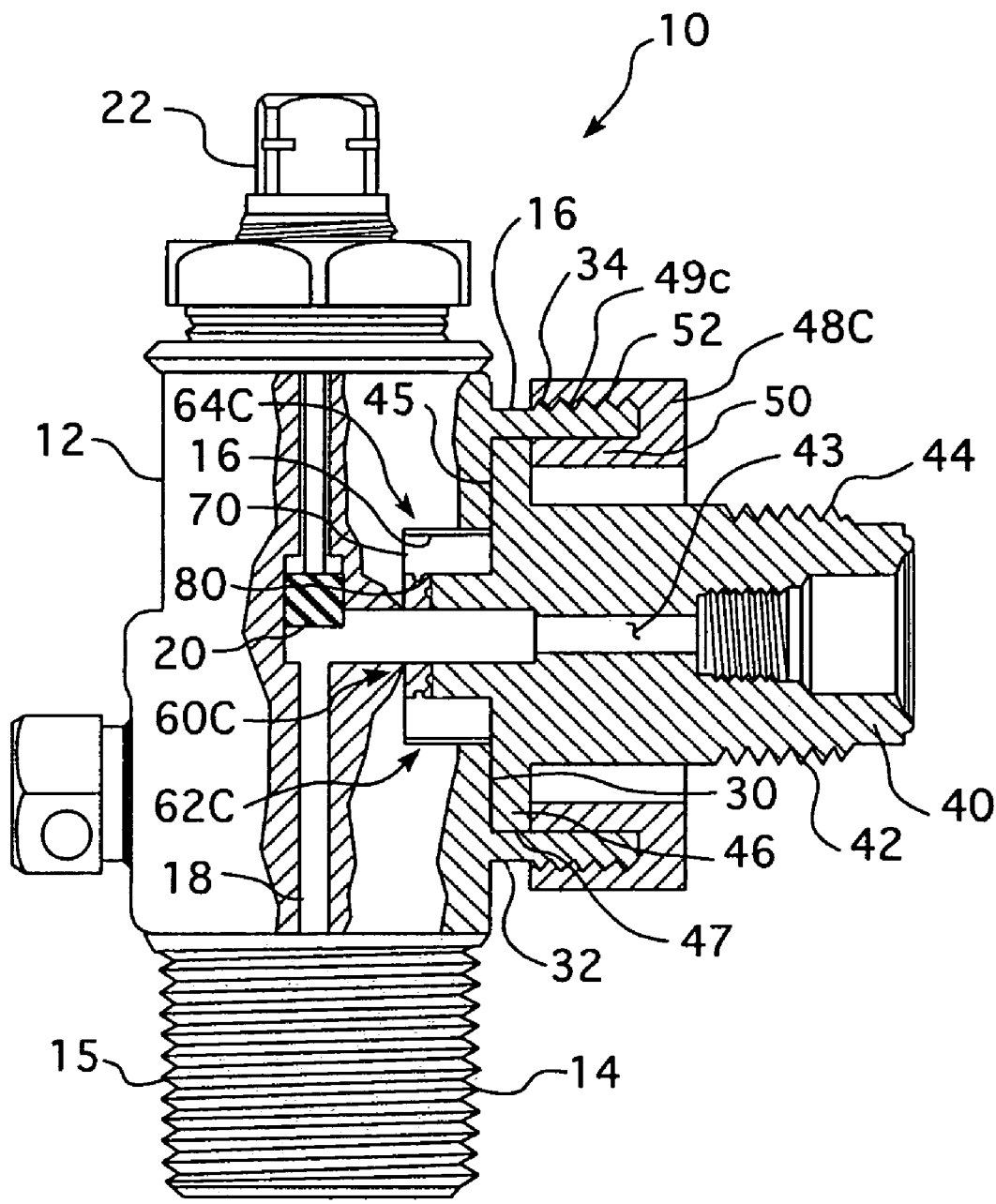
FIG. 4 is a cross-sectional side view of an alternate valve assembly.

The landing 16 includes a generally flat surface 30 and a generally circular collar 32. The surface 30 extends in a plane generally parallel to the longitudinal axis of the valve body 12. The collar 32 encircles the surface 30. The collar 32 includes a threaded surface 34. As shown in FIG. 1, the threaded surface 34 may be the inner surface of the collar 32, or, as shown in FIG. 4, the threaded surface 34 may be the outer surface of the collar 32. The internal passage 18 extends generally normal to the surface 30 and is disposed at a central location on the surface 30.

Figure 2:
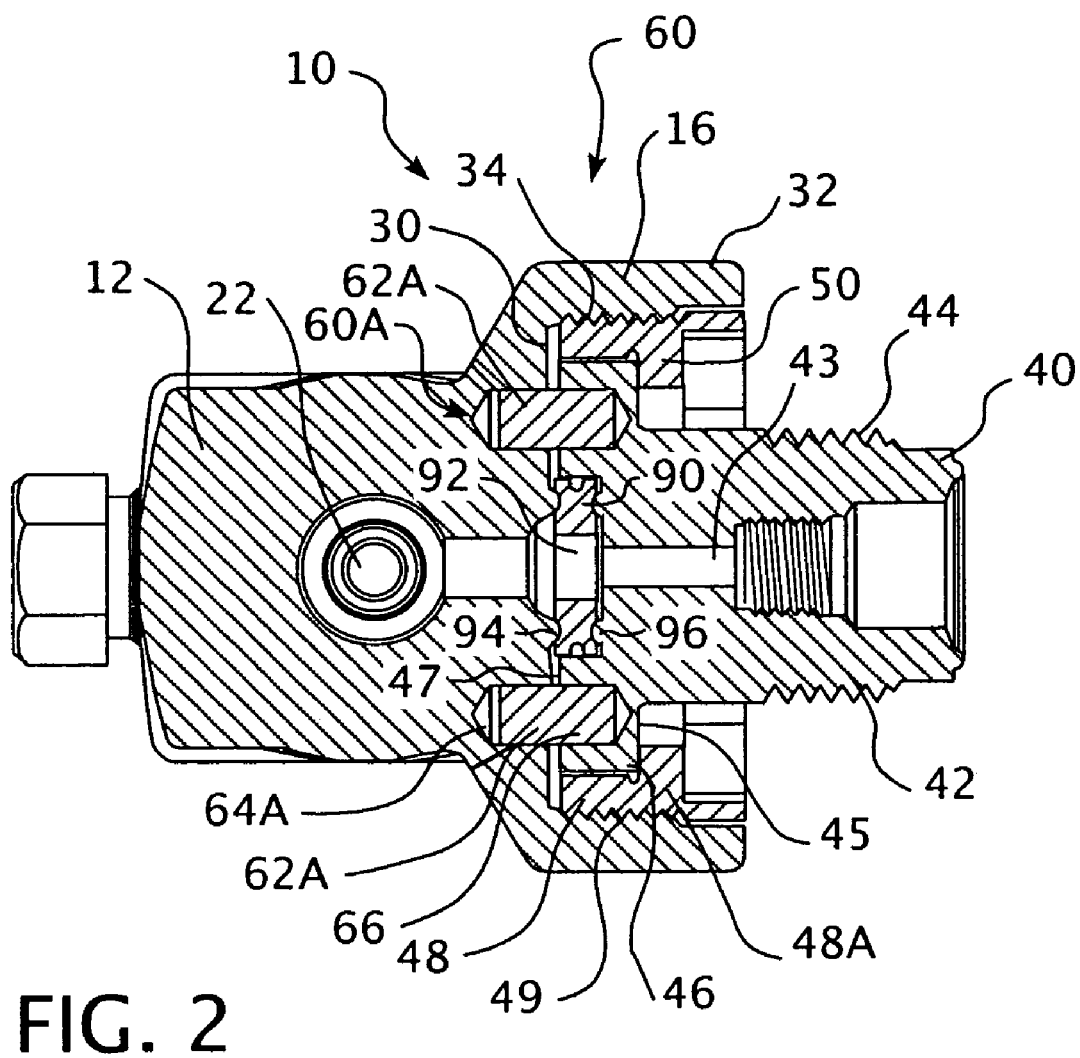
FIG. 2 is a cross-sectional top view of a valve assembly.
Figure 3:
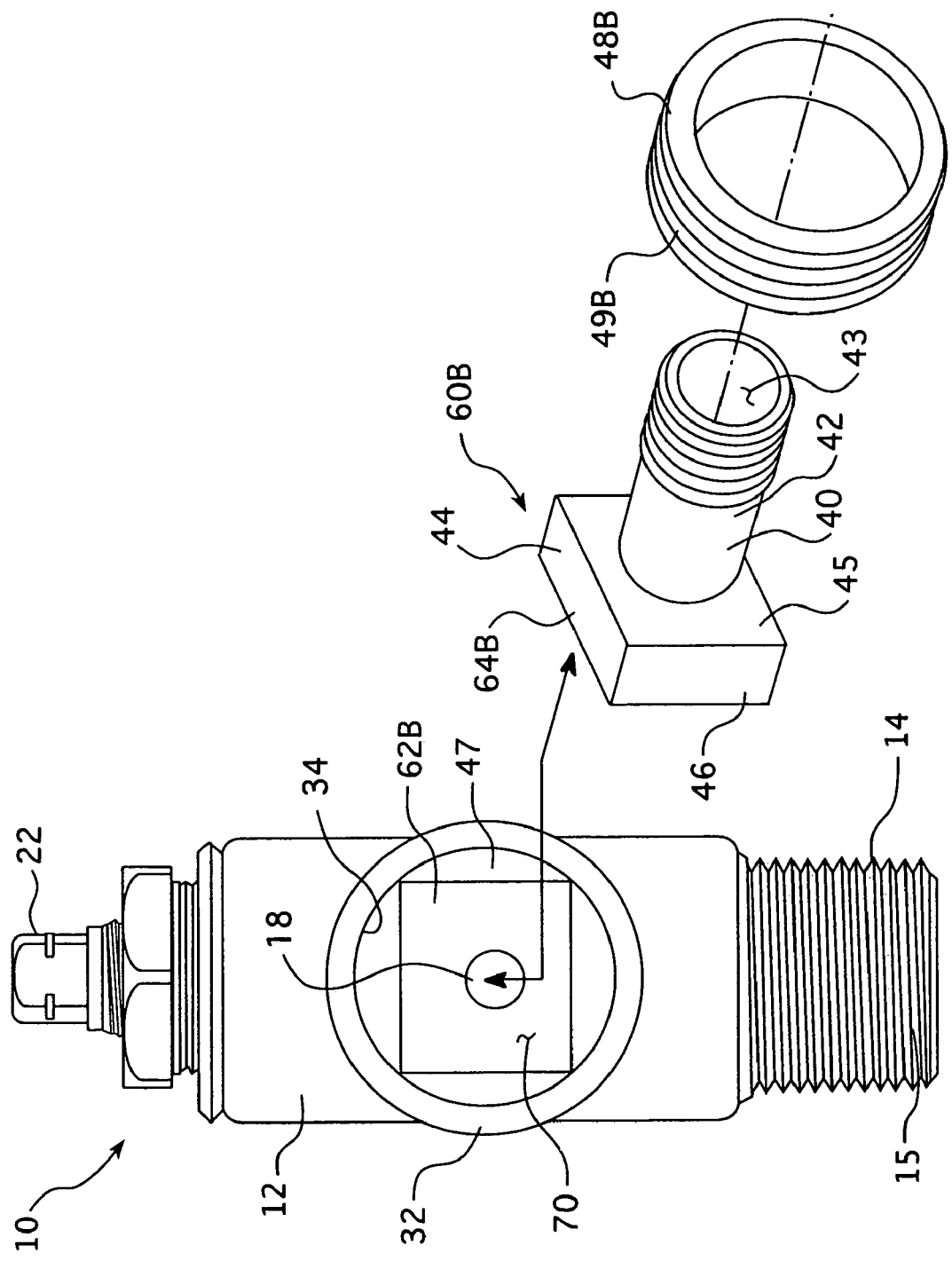
FIG. 3 is a cross-sectional side view of an alternate valve assembly.

The valve assembly 10 further includes a removable outlet adaptor 40. A removable outlet adaptor 40 includes an elongated, body 42 having an internal passage 43, an outlet end 44, structured to engage a use device, and a valve engaging portion 46. The outlet adaptor passage 43 extends from the outlet end 44 to the valve engaging portion 46. The valve engaging portion 46 includes a generally flat face 47 extending in a plane generally perpendicular to the outlet adaptor body 42 longitudinal axis. The valve engaging portion 46 has a greater cross-sectional area than the outlet end 44. Preferably, the increase in cross-sectional area between the outlet end 44 and the valve engaging portion 46 occurs in a single step so that there is a flange with an outer surface 45. The outlet adaptor 40 further includes a retaining ring 48. The retaining ring 48 includes threads 49 structured to engage the landing collar 32 threaded surface 34 as described below. The retaining ring 48 may have any appropriate cross-sectional shape. For example as shown in FIGS. 1 and 2, a retaining ring 48A is a rectangular torus having external threads 49A and an internal flange 50. As shown in FIG. 3, a retaining ring 48B is a rectangular torus having external threads 49B with no additional structures. As shown in FIG. 4, a retaining ring 48C is a U-shaped torus having threads 49C on an inwardly facing, medial surface 52.

An anti-rotation device 60 having a first component 62 and a second component 64 is structured to substantially prevent the removable outlet adaptor 40 from rotating or moving during installation and removal. The first component 62 is disposed on the outlet adapter assembly body 42 and the second component 64 is disposed on the valve body 12. In the embodiment shown in FIG. 1, the first component 62A includes at least one, and preferably two, pins 66 extending from the outlet adaptor body 42. The pins 66, preferably, extend from the face 47 in a direction generally parallel to the outlet adaptor body 42 longitudinal axis. The second component 64A includes a number of pin openings 68 disposed on the landing surface 30. The pin openings 68 correspond to, and are aligned with, the pins 66. The pins 66 are structured to engage the pin openings 68 when the outlet adapter 40 is coupled to the landing 16. That is, when the outlet adapter face 47 is placed parallel and adjacent to the landing surface 30, the pins 66 are disposed in the pin openings 68. Additionally, in this embodiment, both the outlet end 44 and the valve engaging portion 46 are generally cylindrical. When the retaining ring 48A is placed in engagement with the landing collar threaded surface 34, wherein the landing collar threaded surface 34 is located on the inner surface of the collar 32, the act of rotating the retaining ring 48A will not impart a rotating motion to the outlet adaptor 40 due to the anti-rotation device 60A. Additionally, the retaining ring internal flange 50 is structured to engage the outer surface 45 of the valve engaging portion 46. When the outlet adaptor 40 is installed, the outlet adaptor internal passage 43 is in fluid communication with the valve body internal passage 18.

In another embodiment, shown in FIG. 3, the anti-rotation device 60B first component 62B is an outlet end 44 having a non-circular cross-sectional shape. The outlet end 44 preferably has a square or hexagonal shape. The anti-rotation device 60B second component 64B is a cavity 70 in the landing surface 30. The cavity is sized to correspond to the cross-sectional shape of outlet end 44. In this embodiment, the collar threaded surface 34 is again located on the inner surface of the collar 32. The retaining ring 48B may have an increased thickness so that, when the retaining ring 48B is installed, a portion of the retaining ring 48B contacts the outer surface 45 of the valve engaging portion 46. As before, when the outlet adaptor 40 is installed, the outlet adaptor internal passage 43 is in fluid communication with the valve body internal passage 18.

In another embodiment, shown in FIG. 4, the anti-rotation device 60C first component 62C is an extension 80 protruding in a longitudinal direction from the outlet end 44. The extension 80 has a non-circular cross-sectional shape. The extension 80, preferably, has a square or hexagonal shape (as shown). The extension 80 has a cross-sectional area that is smaller than the valve engaging portion 46. The valve engaging portion 46 has a generally cylindrical cross-sectional shape. The anti-rotation device 60C second component 64C is a cavity 70 in the landing surface 30. The cavity 70 is sized to correspond to the cross-sectional shape of extension 80. In this embodiment, the collar threaded surface 34 is located on the outer surface 45 of the collar 32. When the retaining ring 48C is installed, a portion of the retaining ring 48C contacts the outer surface 45 of the valve engaging portion 46. As before, when the outlet adaptor 40 is installed, the outlet adaptor internal passage 43 is in fluid communication with the valve body internal passage 18.

As shown in FIG. 1, the interface between the landing 16 and the outlet adaptor 40, preferably, includes at least one gasket 90. Preferably, the at least one gasket 90 is a torus disposed about the interface between the outlet adaptor internal passage 43 and the valve body internal passage 18. To accommodate the at least one gasket 90, the outlet adapter body 42 may include a recess 92 structured to capture the at least one gasket 90. Further, the landing surface 30 may include a ridge 94 encircling the valve body internal passage 18 and/or the recess 92 may include a ridge 96 encircling the adaptor internal passage 43. The ridge(s) 94, 96 act to ensure a tight seal exists at the interface. Further, to reduce the chance of the retaining ring 48 loosening inadvertently, the collar 32 may include a locking device 100, such as, but not limited to, a lateral, threaded opening 102 and a set screw 104. When tightened, the set screw 104 engages the retaining ring 48 and applies a radial force.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A valve assembly comprising:
    a valve body having an internal passage, an outlet landing, and a vessel coupling;
    said valve body passage extending between said outlet landing and said vessel coupling;
    a valve member structured to move between an open position, wherein said valve member does not block a fluid from flowing through said internal passage, and a closed position, wherein said valve member blocks a fluid from flowing through said internal passage;
    an actuating device coupled to said valve body and structured to move said valve member;
    said outlet landing including a generally flat surface and a collar, said collar encircling said flat surface, said collar further having a threaded surface;
    an outlet adapter having a retaining ring and an elongated body with an internal passage, said body having a valve engaging portion and an outlet end;
    said retaining ring having threads, said external threads structured to engage said collar threaded surface;
    an anti-rotation device having a first component on said outlet adapter body and a second component on said valve body;
    wherein said outlet adaptor body outlet end is sized to extend through said retaining ring; and
    wherein said outlet adaptor is coupled to said outlet landing with said valve engaging portion facing said surface, said retaining ring disposed about said outlet end, and said retaining ring coupled to said collar, said anti-rotation device structured to prevent said outlet adapter rotating as said outlet adapter is installed.

2. The valve assembly of claim 1 wherein:
    said anti-rotation device first component includes a pair of pins extending from said outlet adapter body;
    said anti-rotation device second component includes a pair of pin openings in said landing surface; and
    wherein said pins are positioned to extend into said pair of pin openings when said outlet adapter body is disposed within said collar.

3. The valve assembly of claim 2 wherein said retaining ring includes an inwardly extending flange structured to engage said outlet adapter body valve engaging portion.

4. The valve assembly of claim 2 wherein said outlet adapter body outlet end is generally cylindrical.

5. The valve assembly of claim 2 wherein said outlet adapter includes a gasket, said gasket having a torus shaped body structured to be disposed about said outlet adaptor internal passage and between said adaptor body valve engaging portion and said landing flat surface.

6. The valve assembly of claim 5 wherein said outlet adapter body includes a recess structured to capture said gasket.

7. The valve assembly of claim 5 wherein flat surface includes a ridge encircling said valve body internal passage at said landing surface, said ridge structured to engage said gasket.

8. The valve assembly of claim 1 wherein:
    said anti-rotation device first component having an adaptor body valve engaging portion having a non-cylindrical cross-sectional shape; and
    said anti-rotation device second component includes a cavity in said landing surface, said cavity having a non-cylindrical cross-sectional shape corresponding to said anti-rotation device first component.

9. The valve assembly of claim 8 wherein said retaining ring includes an inwardly extending flange structured to engage said outlet adapter body valve engaging portion.

10. The valve assembly of claim 8 wherein said outlet adapter body outlet end is generally cylindrical.

11. The valve assembly of claim 8 wherein said outlet adapter includes a gasket, said gasket having a torus shaped body structured to be disposed about said outlet adaptor internal passage and between said adaptor body valve engaging portion and said landing flat surface.

12. The valve assembly of claim 11 wherein said outlet adapter body includes a recess structured to capture said gasket.

13. The valve assembly of claim 11 wherein landing flat surface includes a ridge encircling said valve body passage at said landing surface, said ridge structured to engage said gasket.

14. The valve assembly of claim 8 wherein said anti-rotation device first component is said the entire adaptor body valve engaging portion.

15. The valve assembly of claim 8 wherein said anti-rotation device first component is an extension protruding axially from the adaptor assembly body valve engaging portion.

16. The valve assembly of claim 1 wherein said retaining ring includes a locking device structured to substantially prevent rotation of the retaining ring.

17. The valve assembly of claim 16 wherein:
    said adaptor body includes a set screw opening; and
    said locking device is a set screw.

* * * * *